(No Model.) 3 Sheets—Sheet 1.

C. O. MAILLOUX.
OUTLET BOX AND FIXTURE SUPPORT.

No. 562,633. Patented June 23, 1896.

WITTNESSES:
Henry T. Kirsel
Wm H. Capel

INVENTOR:
Cyprien O. Mailloux.
by H. C. Townsend
ATTORNEY.

ANDREW B.GRAHAM. PHOTO-LITHO. WASHINGTON D.C.

(No Model.) 3 Sheets—Sheet 2.

C. O. MAILLOUX.
OUTLET BOX AND FIXTURE SUPPORT.

No. 562,633. Patented June 23, 1896.

WITTNESSES:
Henry T. Hirsch.
W. A. Capel.

INVENTOR:
Cyprien O. Mailloux.
by
Townsend
ATTORNEY.

Figure 11:
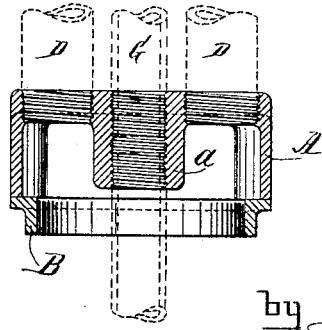

(No Model.) 3 Sheets—Sheet 3.
C. O. MAILLOUX.
OUTLET BOX AND FIXTURE SUPPORT.
No. 562,633. Patented June 23, 1896.
Fig. 11ᵃ.  Fig. 12.  Fig. 12ᵃ.
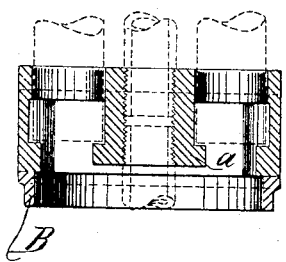
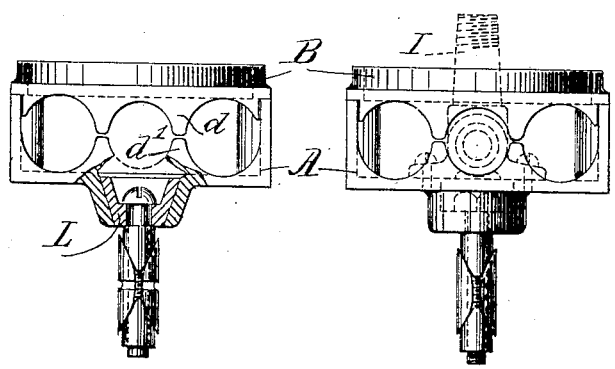
Fig. 13.  Fig. 14.
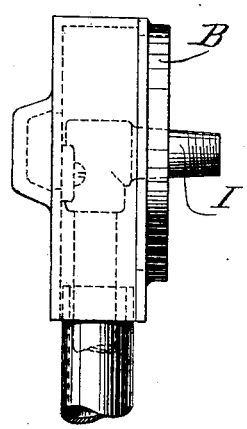
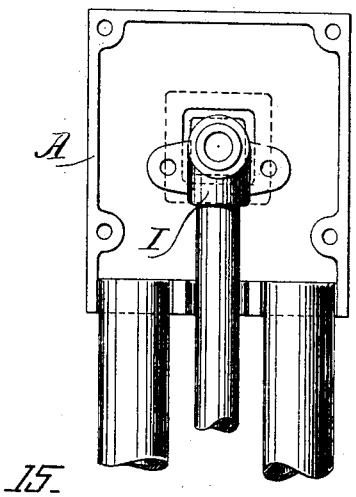
Fig. 15.
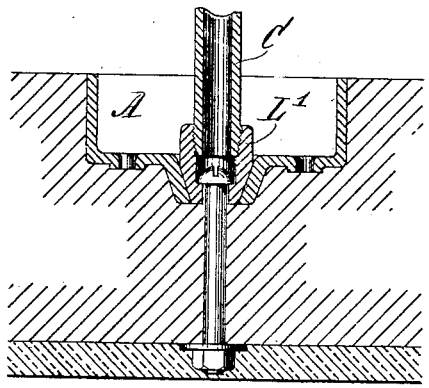
WITNESSES:
Henry T. Hirsch
Wm H Capel
INVENTOR:
Cyprien O. Mailloux.
by H. C. Townsend
ATTORNEY.

UNITED STATES PATENT OFFICE.

CYPRIEN O. MAILLOUX, OF NEW YORK, N. Y., ASSIGNOR TO JULES JOHN JOSEPH DE RYCKE, OF SAME PLACE.

OUTLET-BOX AND FIXTURE-SUPPORT.

SPECIFICATION forming part of Letters Patent No. 562,633, dated June 23, 1896.

Application filed February 20, 1895. Serial No. 539,059. (No model.)

*To all whom it may concern:*

Be it known that I, CYPRIEN O. MAILLOUX, a citizen of the United States, and a resident of New York, in the county of New York and State of New York, have invented a certain new and useful Conduit Outlet-Box and Fixture-Support, of which the following is a specification.

My invention relates to an outlet-box and fixture-support designed for electric wiring and adapted for use in side walls, partitions, and ceilings.

The object of the invention is to provide a box which shall be convenient in use, readily and firmly fixed in position, and free from danger of accidental leaks or grounds from the wires running through it.

Another object of the invention is to provide an electric outlet-box with means for direct attachment of the gas or electric fixture to it, and also to so construct the box that it can be used for combination-fixtures or for electric fixtures.

The various novel features constituting my invention will be first described in connection with the accompanying drawings.

Figure 1:
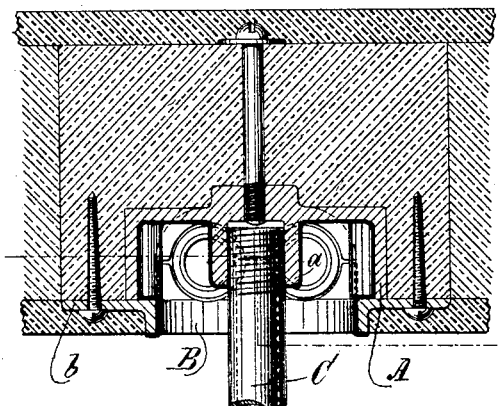
Figure 3:
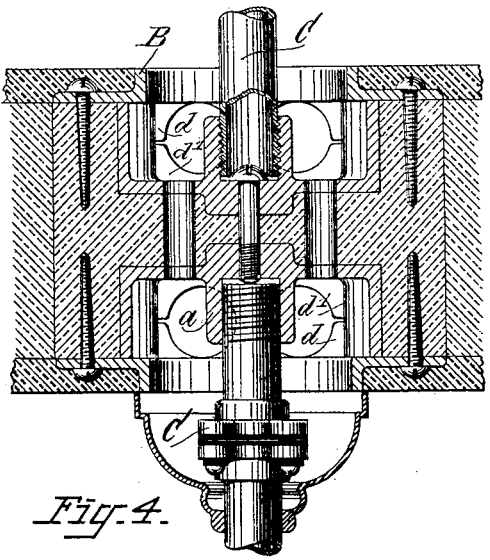
Figure 2:
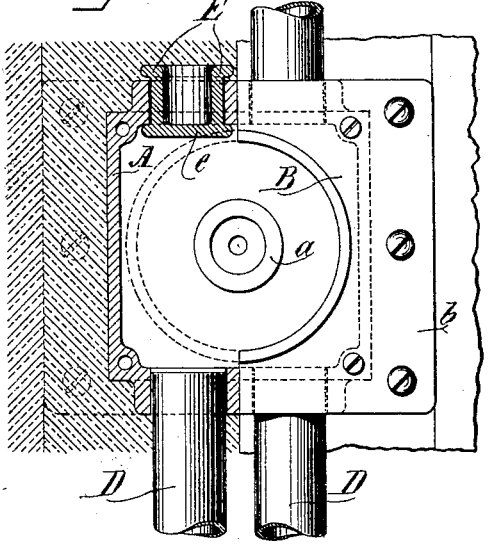
Figure 4:
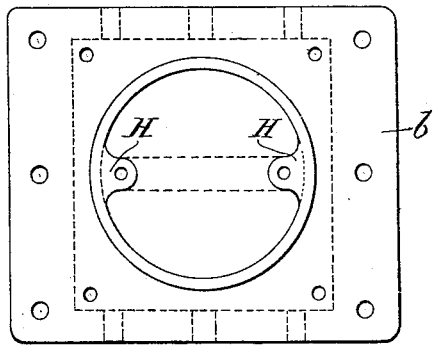
Figure 5:
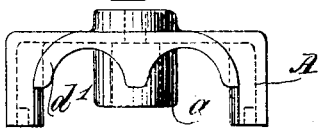
Figure 7:
Figure 8:
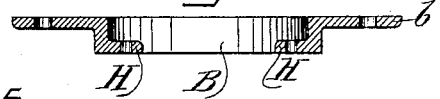
Figure 6:
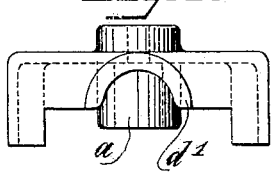
Figure 9:
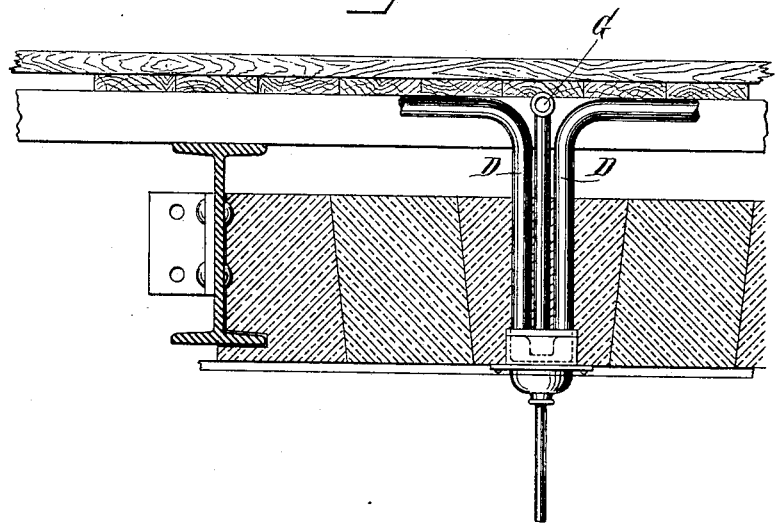
Figure 10:
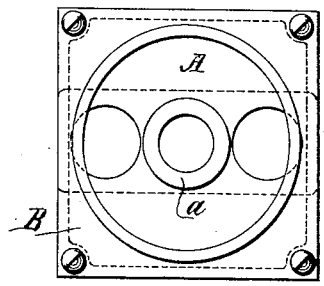

Figure 1 is a cross-section through a partition and outlet-box fixed in position. Fig. 2 is a face view of the same, one-half in section. Fig. 3 is a section through two similar outlet-boxes fixed in opposite sides of a partition to give an outlet on both sides. Fig. 4 is a plan of the outlet-box cover. Fig. 5 is an end view of the body of the box with provision for two conduit-tubes. Fig. 6 is a similar end view of a box-body with provision for one tube. Fig. 7 is an end view of the box-cover. Fig. 8 shows the same modified for a ceiling-outlet. Fig. 9 is a section through a ceiling, showing an outlet-box in position. Fig. 10 is a face view of said box in position, the canopy surrounding the fixture-pipe being removed. Fig. 11 is a cross-section through the box. Fig. 11$^a$ is a similar view of a modification, showing the gas-pipe only as screwed to the box, the conduit-tubes being simply inserted by slip-joints. Fig. 12 is an end view of a box as modified for combined gas and conduit pipes and provided with means for fixing in a side wall. This figure also shows means whereby the box may be utilized for a gas and electric fixture or for an electric fixture without gas. Fig. 12$^a$ is a similar view showing in dotted lines the gas-elbow and showing a change in the form of the expansion-bolt. Fig. 13 is a side view of the same box. Fig. 14 is a face view of the box. Fig. 15 shows the boxes arranged for an electric fixture alone.

A is the body of the box, having a nipple $a$ at or about its center for attachment of the fixture pipe or tube C, which is thus supported directly from the body of the box. The nipple is preferably tapped to receive the screw-threaded end of the pipe, as shown.

B is the cover, which, as shown, has an opening around the fixture-pipe sufficient to allow the electric wires to be conveniently drawn out through it. The cover has a flange or lip $b$ extending preferably all the way around and adapted to receive screws, as shown, which fasten the cover to the wall or ceiling. The flange is afterward covered by the plaster finish of the wall, as shown. If desired, additional means may be used for fastening the box from the rear, as indicated.

It will be seen that the fixture is practically supported from the bottom of the box instead of from the cover, so that after the outlet-box and fixture are set up complete all that is required in order to wire it is to slip back the canopy which conceals the opening in the cover to permit access for drawing the wires through the conduit-tubes entering the box.

Provision is made for any desired number of conduit-tubes D D. These tubes enter bosses in the sides or ends of the box; but these bosses instead of being of the usual construction are in my invention made in two parts, one part, $d$, being carried by the cover and the other, $d'$, by the box-body. When the conduit-tube is applied with its end in position in the lower half of the boss, the application of the cover with the other half completes the boss and the fastening of the cover holds the two halves together with the end of the tube fitting between them.

When a boss is not used, the opening may be closed by a plug E, as shown in Fig. 2. Bushings of similar form without the bottom $e$ may be used as reducers. The boxes and covers are made of iron and the interior surfaces are coated with porcelain or suitable enamel to present an indestructible insulating finish, as indicated by the heavy lines, Fig. 1. This finish is also applied to the exterior of the nipple $a$.

Two boxes may be placed back to back in opposite faces of a partition, as indicated in Fig. 3, and securely fastened together, each from the rear by the screw or bolt, as indicated.

When it is desired to provide for passing a wire from one to the other of such boxes, each is provided with one or more openings in its bottom, as shown, connected by passages in the partition. As will be seen, the means for fastening the box in position coincide with the hollow nipple $a$.

In Fig. 9 the box is shown supported in the ceiling, the wiring-tubes D D entering from the rear, as shown in Fig. 11, where they are shown screwed therein. They may, however, be entered therein simply by slip-joints, as seen in Fig. 11$^a$. In this case provision is made for a gas-pipe G, which is tapped into the rear of the boss $a$, while the outer end of the latter carries the combination-fixture, supported as before, from the bottom of the box. The top or face of the box is open where it is not covered in by the cover-plate, which latter, as already stated, is made with an opening around the fixture-pipe for drawing the wires. The finish is completed by the canopy, as shown. When the box is supported by the gas-tube, as shown, and by the wiring-tubes also, if desired, it is not necessary to extend the cover-plate into a flange and to fasten it independently of the box. The flange is shown in Fig. 8, but is dispensed with in Fig. 10.

The relative dimensions are indicated in Fig. 4. In this figure I have also shown the preferred form of cover-plate. H H are ears or projections upon the cover which adapt the box for attachment of the ordinary "rosette" or cut-out block of porcelain or other material, from which may be supported a "drop" or other light. They also provide for attachment of a wall-socket or other lamp-receptacle at outlets where the same may be desired.

Figs. 12 to 14 show the box as provided with an additional boss or opening adapted to receive a gas-pipe through the side of the box when the same is used in a side wall or partition. In this case an additional split or divided boss may be used similar to those already described. Fastened upon the base of the block is the gas-elbow I, which receives said pipe and carries also the gas and electric fixture. The box is here shown adapted for fixing in a side wall when it is not permissible to attach from the opposite side of the supporting structure.

As shown, an expansion-bolt is provided. This bolt passes through a removable bushing or plug L, in the bottom of the box at or about its center. The gas-elbow is fastened to the box over said plug. The plug is preferably square, Figs. 12, 13, and 14, to prevent it from turning in its seat, though it may be round, as indicated in Fig. 12$^a$. When the box is used for an electric fixture, the plug may be replaced by an interchangeable plug, such as L', (indicated in Fig. 15,) which is formed with a nipple for attachment of the electric fixture. The head of the bolt is seated in the plug, as shown.

In all cases the box should be provided with the porcelain lining.

What I claim as my invention is—

1. The combination with an outlet-box having a seat formed in the bottom thereof, of a removable bushing fitted to said seat, a bolt passing through said bushing for securing the box in place, and a gas-elbow removably secured to the back of the box over the bushing-seat.

2. An outlet-box having openings for fixture-tubes and wiring-tubes and having a screw-threaded nipple formed integrally with the box and projecting inwardly from its bottom for the attachment of the fixture-tube, a hole being formed in the center of said nipple for receiving the device for securing the box in place.

3. An electric-wiring outlet-box having a removable cover provided with a flange projecting beyond the box by which the cover may be fastened directly to the wall or ceiling, as and for the purpose described.

4. The combination with an outlet-box having a seat formed in the bottom thereof, of a removable bushing fitted to said seat, and a bolt passing through said bushing for securing the box in place.

5. The combination with an outlet-box having a seat formed in the bottom thereof, of a removable bushing fitted to said seat and having a nipple formed integral therewith for the attachment of a fixture, and a bolt passing through said bushing for securing the box and fixture in place.

6. The combination with an electric-wiring outlet-box, provided with a number of split bosses or sockets the halves of which are formed respectively upon the box and its cover for the reception of wiring-tubes, of a plug having flanges upon both ends and fitted to said bosses, as and for the purpose set forth.

7. A ceiling outlet-box having openings for fixture-tubes and wiring-tubes and having an internally-screw-threaded nipple integral with its bottom to receive a gas-pipe in one end to hold the box in place and to receive a fixture in the other end and having projections upon the nipple to limit the insertion of and to support wiring-tubes.

Signed at New York, in the county of New York and State of New York, this 13th day of February, A. D. 1895.

CYPRIEN O. MAILLOUX.

Witnesses:
WM. H. CAPEL,
HENRY T. HIRSCH.